United States Patent
Rata et al.

(10) Patent No.: US 6,416,843 B1
(45) Date of Patent: Jul. 9, 2002

(54) CARING DOCTOR BLADE AND METHOD FOR MANUFACTURE OF SAME

(75) Inventors: Ilkka Rata; Juhani Vestola, both of Jyväskylä (FI)

(73) Assignee: Metso Paper, Inc., Helsinki (FI)

(*) Notice: Subject to any disclaimer, the term of this patent is extended or adjusted under 35 U.S.C. 154(b) by 0 days.

(21) Appl. No.: 09/297,627
(22) PCT Filed: Sep. 4, 1998
(86) PCT No.: PCT/FI98/00690
§ 371 (c)(1), (2), (4) Date: May 4, 1999
(87) PCT Pub. No.: WO99/12726
PCT Pub. Date: Mar. 18, 1999

(30) Foreign Application Priority Data

Sep. 11, 1997 (FI) .................................................. 973659

(51) Int. Cl.⁷ ............................ B41F 31/02; D21F 1/32; D21G 3/00
(52) U.S. Cl. ................ 428/119; 101/425; 101/464; 162/272; 162/281; 162/375; 428/421
(58) Field of Search ........................ 428/35.7, 119, 428/421; 101/425, 464; 162/272, 281, 375

(56) References Cited

U.S. PATENT DOCUMENTS

| | | | |
|---|---|---|---|
| 4,549,933 A | * 10/1985 | Judd et al. | 162/281 |
| 4,680,224 A | 7/1987 | O'Connor | 428/294 |
| 5,017,643 A | 5/1991 | Snelling et al. | 524/609 |
| 5,174,862 A | 12/1992 | Hale et al. | 162/272 |
| 5,460,565 A | 10/1995 | Perneczky | 451/162 |
| 5,597,449 A | 1/1997 | Vestola et al. | 162/199 |
| 5,623,718 A | 4/1997 | Bracken et al. | 399/284 |

FOREIGN PATENT DOCUMENTS

| | | | |
|---|---|---|---|
| EP | 0330980 | 9/1989 | B29B/15/12 |
| JP | 54149787 | * 11/1979 | |

OTHER PUBLICATIONS

Abstract of JP5338048 (1 page).
Abstract of JP54149787 (1 page).

* cited by examiner

Primary Examiner—Harold Pyon
Assistant Examiner—Sandra M. Nolan
(74) Attorney, Agent, or Firm—Steinberg & Raskin, P.C.

(57) ABSTRACT

The invention concerns a caring doctor blade for a paper/board machine, which blade comprises layers of fiberglass and carbon fiber and a caring layer as a rigid laminated structure, which caring layer comprises carbon fiber and grinding particles in direct vicinity of the carbon fibers. The orientation of the fiberglass layers is parallel to the longitudinal axis of the blade, and at least in some of the layers that contain carbon fiber the orientation of the carbon fibers is substantially diverging from the direction of the longitudinal axis of the blade. The invention also concerns a method for manufacture of a doctor blade for a paper/board machine by means of a pultrusion method.

20 Claims, 1 Drawing Sheet

CARING DOCTOR BLADE AND METHOD FOR MANUFACTURE OF SAME

FIELD OF THE INVENTION

The invention concerns a caring doctor blade for a paper/board machine and a method for manufacture of same.

BACKGROUND OF THE INVENTION

The faces of the rolls in a paper/board machine tend to be coated with impurities coming from the process and with material of the doctor blade. For removal of these materials from the roll faces, doctor blades are employed.

Typical commercial blades are described, for example, in the U.S. Pat. No. 4,549,933 and in the U.S. Pat. No. 1,694,755.

In the U.S. Pat. No. 4,549,933, a doctor blade for a paper machine is described, which consists of a number of alternating layers of fibre and carbon fibre so that the fibre layer may be composed of cotton, paper, fibreglass, or equivalent. Such a blade detaches contaminations, but, on the other, foreign material is separated from the blade onto the roll face.

In the U.S. Pat. No. 1,694,755, a doctor blade meant for cleaning of rolls and cylinders is described for use in pulp and paper industry. This blade is made of a composite material, in which, over the thickness of the blade, layers of fibre and fabric filler perpendicular to the blade edge alternate. This doctor blade is used for cleaning of the roll faces. Besides the fabric filler, for the doctor, carbon band, boron fibre or tungsten is used as fibre, and the alignment of the fibres is perpendicular to the direction of the blade.

None of said blade constructions contains particles of abrasive material.

In the U.S. Pat. No. 5,174,862, a polishing doctor blade is described for polishing the metal face of a calender roll. The machining face placed at the head of the blade comprises grinding particles mixed with an epoxy matrix, such as carbides or diamonds. The blade does not operate as a doctoring blade. It is meant exclusively for calender rolls, at which its function is exclusively to grind/polish the face of the calender roll.

In the FI Patent Application No. 941620, corresponding to U.S. Pat. No. 5,597,449, a method and an equipment are described for conditioning of the coating on a roll in a paper machine. What is concerned is not a doctor blade, but in the method of FI-941620 the roll is ground by means of a separate grinding rib to be attached to a doctor blade so as to correct the roughness of the roll face to make the face either smoother or rougher, as required. In such a case, the conditioning of the roll face takes place during a standstill on-site, i.e without removing the roll from the machine, but the device does not operate during production or at a production speed.

Coating with a foreign material often results in alteration of the surface properties of a roll, which again deteriorates the runnability and the properties of paper. If the coating is intensive, the roll face may become excessively smooth, which results, on a centre roll in the press, for example, in more difficult separation of the paper web, passing of the web through the doctor, and, thus, in increased susceptibility of web breaks. Besides the coating effect, a second negative aspect in the case of metal blades is scratching of the roll face or, in some cases, penetration of the blade into the roll coating if a polymer-based coating is concerned. Also, excessive roughening of a roll face, which occurs with prolonged operation of metal blades, causes deterioration of the operating capacity of the roll face.

Smoothing or roughening of a roll face is typical of a roll that contains ceramic coating material, but it also occurs with other coatings. The coating effect of the blades of reinforced plastic commonly employed with ceramic roll coatings mainly results from adhesion of particles detached from the blade by abrasion or from melting of the matrix plastic onto the roll face. On the other hand, materials coming from the process also adhere to the roll face, which materials cannot be removed by the doctor from the recesses in the roughness of the face, as the doctor cannot remove the layer of impurities deposited on these materials "anchored" on the bottom of said recesses either, because the adhesion is too strong.

Even the best conventional doctor blade cannot remove all the undesirable material already adhering to the roll face from the roll face, but the blade often brings more material to the roll face. This is why there has been a need to develop a doctor blade which removes undesirable contaminations or other material coated onto the roll face from the roll face to a greater extent than the blade itself brings onto the roll face and which doctor blade keeps the roll face in its original condition or restores it to its original condition.

OBJECTS AND SUMMARY OF THE INVENTION

The object of the present invention is a caring doctor blade for a paper/board machine, which blade removes undesirable coated material from the roll face and, at the same time, services the roll face, and a method for manufacture of such a blade.

The doctor blade in accordance with the present invention and the method for manufacture of same are characterized in what is stated in the patent claims.

By means of the solution that will be described in the following, the problems involved in the prior-art solutions are avoided and the objectives that have been set are achieved. In the solution in accordance with the invention, in the caring doctor blade, an abrasive blade and an almost optimal, carbon-fibre reinforced composite blade of reinforced plastic are combined. The caring doctor blade is not supposed to be exclusively abrasive, as the conventional abrasive blades are, but it is also supposed to have excellent doctoring and cleaning properties. Thus, in the caring doctor blade, the functions of two different blade types are combined. It is an essential feature of the properties of the caring blade that the structure of the blade is of a correct sort. The blade is a carbon-fibre/fibreglass composite, which contains a grinding material in a layer that contains fibreglass or carbon fibre. The content of carbon fibre in the composite is high, the content of the matrix material is low, and the fibre orientation is optimal.

BRIEF DESCRIPTION OF THE DRAWINGS

The solution in accordance with the invention will be described in detail in FIG. 1 in which a preferred solution in accordance with the present invention is illustrated by way of example.

DETAILED DESCRIPTION OF THE PREFERRED EMBODIMENTS

Figure 1:
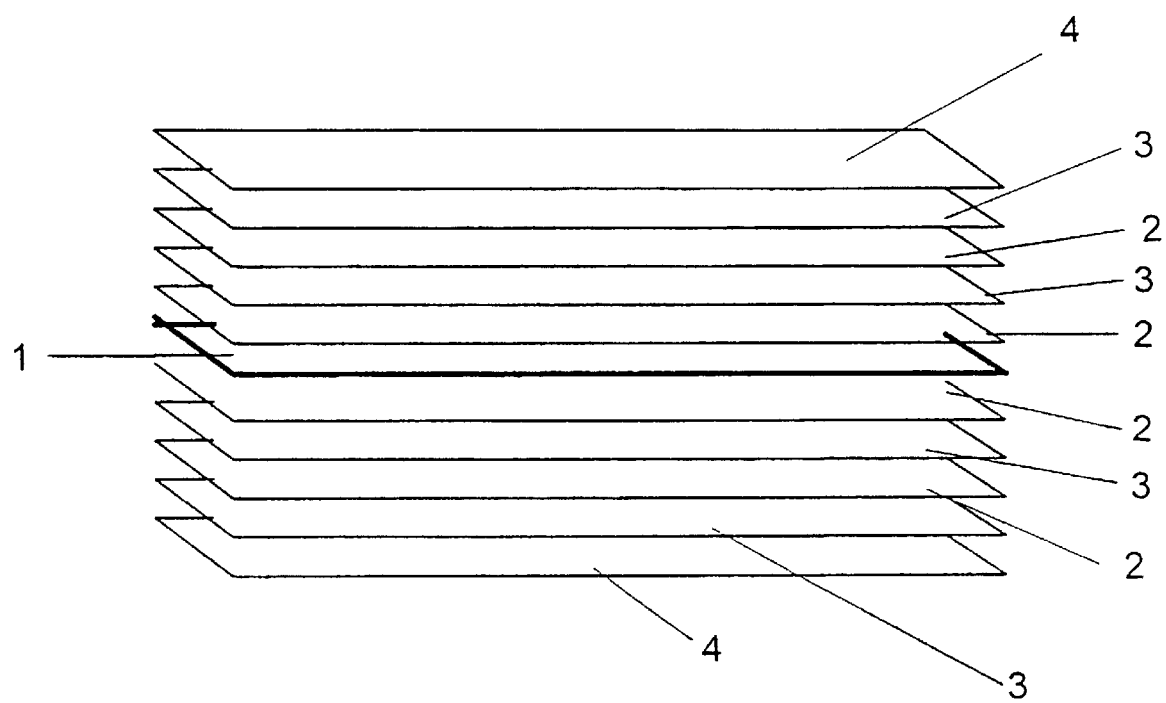

The doctor blade as shown in FIG. 1 comprises a rigid laminate structure consisting of fibreglass and carbon fibre layers 2 and 3 and of at least one caring layer 1. The caring layer 1 is surrounded by fibreglass layers and possibly by carbon fibre layers. Besides carbon fibre, the carbon fibre layers 3 may also contain fibreglass. In the fibreglass layers 2, the fibreglass layers are orientated parallel to the longitudinal axis of the blade, and in at least some of the layers that contain carbon fibre, the carbon fibres are orientated substantially obliquely to the longitudinal axis of the doctor blade, preferably transversely to the blade direction. The topmost layers 4 are preferably mats with fibreglass surface.

The caring layer 1 comprises carbon fibres and grinding particles in direct vicinity of the carbon fibres, possibly additionally also glass fibres. As the grinding particles, it is possible to employ silicon carbide particles, diamond, boron nitride, aluminum oxide, or equivalent, the preferable one being silicon carbide. In the layer, there may be grinding particles across the entire width of the blade, but they can also be placed differently, for example at the edge of the blade that enters into contact with the roll. The grinding particles have been introduced into connection with the carbon fibres, for example, by impregnating into a carbon fibre fabric by means of a matrix material, which can be thermosetting or thermoplastic resin, and its basic matrix can be fluorinated.

In order that a suitable caring grinding effect could be obtained, the nature of the grinding agent (silicon carbide, diamonds, boron nitride, aluminium oxide, or equivalent; preferably silicon carbide) and the particle size (30 to 250 $\mu$m; preferably 45 to 125 $\mu$m) and the amount of particles on the wear face placed against the roll are chosen appropriately. The amount can be changed by adjusting the density of particles in the layer and/or by increasing the number of the layers that contain particles, for example 1 to 5 layers. The duration of the grinding effect can be regulated by fitting the particles on a certain distance within the wear margin only. In this way the grinding effect can be standardized in the cross direction of the whole roll even if the rate of wear of the blade in different areas were different. When expensive grinding materials are used, it is preferable to place the particles in the area of the wear margin only.

The thickness of the doctor blade is preferably about 1.8 to 2.8 mm, while the thicknesses of the individual layers are of an order of about 0.1 to 0.3 mm, the caring layer about 0.1 ... 0.4 mm. The doctor blade is manufactured preferably by means of a pultrusion method. In such a case, the grinding material is brought into connection with the carbon fibre fabric, for example impregnated into said fabric, before the pultrusion stage. Also, conventional methods known from the manufacture of sandwich constructions can be employed.

The higher the content of carbon fibre in the doctor blade of reinforced plastic is in relation to fibreglass and in particular in relation to matrix plastic, the slower is the covering of the roll face with plastic or the coating of the roll face at least in respect of the material separated from the blade. The case is also affected by how optimal the fibre orientation in the blade is and how good the resistance to heat of the matrix is. Favourable matrix materials are thermosetting or thermoplastic resins that endure a temperature higher than 200° C. Longitudinal glass fibres and possible carbon fibres give the structure the necessary robustness and rigidity in the longitudinal direction.

From the point of view of the operability of the blade, it is important that the grinding, hard particles, for example silicon carbide, are surrounded by carbon fibre. The function of the carbon fibre is to conduct the arising friction heat away from the grinding particles so that the matrix material around the particles of grinding material does not burn or melt, with resulting removal of the grinding particles. A substantially cross-direction orientation of the carbon fibres provides good conductivity of heat away from the tip of the-blade, i.e. away from the matrix which constitutes the fixing agent for the grinding material and from the particles of grinding material, in which case the melting of the matrix is reduced. Further, the rigidity of the blade in the cross direction is high, which improves the doctoring result. The blade is, however, resilient in the longitudinal direction of the blade, in which case the blade follows the roll face and complies with the roll face well over the entire length of the blade. Such a doctor blade operates excellently as a shearing blade, in addition to the abrading effect; a conventional abrasive blade cannot cut off the impurities. Thus, by means of a single blade, a multiple effect is obtained, which provides evident advantages also in a case in which, on the rolls, both a grinding blade and a shearing blade can be used separately in a doctor.

What is claimed is:

1. A doctor blade for removing impurities from a roll face of a roll in a paper/board machine, said blade comprising:
    a laminated structure having a plurality of fibrous layers, wherein at least one layer is made of carbon fiber or substantially containing carbon fiber, and in which layer the orientation of the carbon fibers is substantially diverging from the direction of the longitudinal axis of the blade, optionally in the cross direction of the blade, and wherein said at least one layer contains grinding particles for roughening or smoothing the roll face, said grinding particles being surrounded by said carbon fibers for conducting heat away from said grinding particles.

2. A doctor blade as claimed in claim 1, characterized in that the grinding material is selected from the group consisting of silicon carbide, diamond, boron nitride and aluminum oxide.

3. A doctor blade as claimed in claim 1, characterized in that the grinding particles are are impregnated into a fabric of carbon fiber by means of a matrix material, said matrix material being one of a thermosetting and thermoplastic resin.

4. A doctor blade as claimed in claim 1, characterized in that the grinding particles are placed at the edge that enters into contact with the roll, preferably in the area of the wear margin of the blade only or in a part of said area only.

5. A doctor blade as claimed in claim 1, characterized in that the layer of carbon fibre that contains grinding particles has been surrounded with layers of fibreglass and carbon fibre, in which layers the directions of orientation of the glass fibres are substantially parallel to the longitudinal axis of the blade, and in which layers the directions of orientation of the carbon fibres are substantially diverging from the direction of the longitudinal axis of the blade.

6. A doctor blade for removing impurities from a roll face of a roll in a paper/board machine said blade comprising;
    an elongated laminated structure having a longitudinal axis and comprising at least one caring layer containing carbon fibers and grinding particles which are surrounded by said carbon fibers for conducting heat away from said grinding particles,
    said carbon fibers being oriented in a direction substantially diverging from a direction of the longitudinal axis;
    wherein said elongated laminated structure is structured and arranged for removing impurities from said roll face of said roll.

7. The doctor blade of claim 6, wherein said carbon fibers are oriented in a direction substantially perpendicular to the longitudinal axis.

8. The doctor blade of claim 6, wherein said grinding particles are selected from the group consisting of silicon carbide, diamond, boron nitrate and aluminum oxide.

9. The doctor blade of claim 6, wherein said grinding particles have a size from 30 to 250 µm.

10. The doctor blade of claim 6, wherein said grinding particles have a size from 45 to 250 µm.

11. The doctor blade of claim 6, wherein said at least one caring layer further comprises a matrix material, said grinding particles being impregnated into a fabric of said carbon fibers by means of said matrix material.

12. The doctor blade of claim 11, wherein said matrix material is made from a thermosetting resin or a thermoplastic resin.

13. The doctor blade of claim 11, wherein said matrix material is fluorinated.

14. The doctor blade of claim 6, wherein said grinding particles are placed at an edge of said at least one caring layer.

15. The doctor blade of claim 6, further comprising at least one layer of fiberglass arranged on each side of said at least one caring layer, said at least one layer of fiberglass containing glass fibers oriented in a direction substantially parallel to the longitudinal axis.

16. The doctor blade of claim 15, further comprising at least one layer of carbon fiber arranged on each side of said at least one caring layer, said at least one layer of carbon fiber containing carbon fibers oriented in a direction substantially diverging from the longitudinal axis.

17. A doctor blade as claimed in claim 2, wherein said grinding material has a particle size between 30 µm and 250 µm.

18. A doctor blade as claimed in claim 17, wherein said grinding material has a particle size between 45 µm and 125 µm.

19. A doctor blade as claimed in claim 3, wherein said thermosetting resin is fluorinated.

20. A doctor blade as claimed in claim 3, wherein said thermoplastic resin is fluorinated.

* * * * *